MICROWAVE TRANSMISSION SYSTEM

Filed Feb. 21, 1948 3 Sheets-Sheet 1

INVENTOR
W. J. ALBERSHEIM
BY
N. S. Ewing
ATTORNEY

MICROWAVE TRANSMISSION SYSTEM

Filed Feb. 21, 1948 3 Sheets-Sheet 2

INVENTOR
W. J. ALBERSHEIM
BY N. A. Ewing
ATTORNEY

INVENTOR
W. J. ALBERSHEIM
BY N. S. Ewing
ATTORNEY

Patented June 12, 1951 2,556,669

UNITED STATES PATENT OFFICE 2,556,669

MICROWAVE TRANSMISSION SYSTEM

Walter J. Albersheim, Interlaken, N. J., assignor to Bell Telephone Laboratories, Incorporated, New York, N. Y., a corporation of New York Application February 21, 1948, Serial No. 10,148

29 Claims. (Cl. 250—9)

This invention relates in general to the transmission and reception of radio waves, and more particularly to radio carrier signaling systems.

In accordance with certain prior art systems, such as disclosed in Patent 1,771,148 to C. A. Sprague, July 22, 1930, the wire circuits used in conventional telephone practice to conduct electrical message currents between central and satellite stations are replaced by directed beams of microwave radio energy which are initiated in the central station, and intercepted and reflected at each of the satellite stations. Messages are transmitted from the central station by modulation of the transmitted carrier beam; and from the respective satellite stations by modulation of the reflected carrier beam.

In an improved microwave telephone system of the aforesaid type, which is disclosed by S. D. Robertson in application Serial No. 54,431, filed at even date herewith, calling satellite stations are located by a scanning carrier beam initiated at the central station and contacting each of the satellite stations in succession. In response to a calling signal, the beam is halted in the direction of the calling satellite station for the transmission of speech and ringing signals. In the system disclosed by Robertson supra, signals directed from a satellite station to the central station are impressed as amplitude modulations on the reflected carrier beam, such modulations being produced at the satellite station by electrical means comprising a crystal rectifier mounted in the reflecting wave guide which undergoes impedance changes in response to impressed signal currents.

Moreover, the system disclosed by Robertson supra also provides for homodyne reception at the central station, whereby the received component of modulated carrier wave is combined with an unmodulated carrier component, and the modulating signals detected therefrom. The homodyne method of reception has the advantage of permitting narrow band audio frequency amplification, but as conventionally used it is subject to fluctuations in the signal level which result from phase shifts in the carrier wave brought about by slight variations in the frequency of the transmitted carrier wave.

Moreover, in a homodyne system of the aforesaid type disclosed by Robertson, whereas privacy is inherent in communications between the central station and satellite stations located in respectively different directions, difficulties arise when the central station communicates with one of several satellite stations located in substantially the same direction therefrom.

This latter problem has been partially solved in another embodiment of the invention disclosed by Robertson supra, wherein the carrier beam transmitted from the central station is frequency modulated with a saw-tooth frequency sweep, and the echo wave reflected from the satellite station beaten with a component of transmitted carrier to produce an intermediate frequency wave which is utilized for frequency multiplex discrimination between satellite stations located in the same direction but at different distances from the central station.

It is the broad object of this invention to provide improvements in the transmission and reception of radio waves, particularly in reflected carrier beam systems of the types disclosed by Sprague and Robertson supra.

A more specific object of the invention is improved discrimination in systems of the aforesaid type between satellite stations located at different distances but in the same direction from the central station.

Another object of this invention is reduction of level fluctuations and improvement of the signal-to-noise ratios in systems of the aforesaid type.

The present invention relates to a microwave telephone system including a plurality of satellite stations, such as disclosed by Robertson supra, in which the carrier wave beam is transmitted from the central station. Speech and ringing signals transmitted from the central station to a selected satellite station are superposed as amplitude modulations on a carrier beam. The audio signals are derived at the satellite station by means of a crystal detector mounted in a tuned wave guide. In accordance with a particular feature of the invention, when it is desired to transmit speech and ringing signals from a satellite station to the central station, a tuned wave guide, or alternatively, a resonant iris is detuned in accordance with impressed signal currents thereby modulating the reflected energy of the carrier beam initiated at the central station.

It is apparent that the modulators aforesaid are extremely frequency sensitive, and are adapted for tuning to a particular band of carrier frequencies, which has certain advantages as applied to echo beam telephone systems.

In accordance with one embodiment of the invention, modulating means, such as described, are utilized in the satellite stations in conjunction with a homodyne system of reception at the central station wherein a particular carrier beam is confined to a limited band of carrier frequencies.

Such a system as aforesaid has the advantage of affording discrimination between satellite stations located in the same direction but at different distances from the central station. This is provided by a plurality of beam transmitting and receiving apparatus at the central station, adapted for interconnection, and each operating on a different band of carrier frequencies to which the modulators at selected satellite stations are respectively tuned.

An additional feature of the modified homodyne echophone system referred to in the foregoing paragraph is an equalizer circuit incorporated in the central station receiver, which operates to reduce distortion in the received signal, which is largely caused in homodyne reception by shifts in the phase relation between the transmitted and received carrier component.

The equalizer circuit provided in accordance with my invention substantially solves this problem by the separation of the received speech modulated carrier wave reflected from the satellite station into two substantially equal components, which are respectively modulated with substantially equal components of transmitted carrier wave in relative phase quadrature. The resultant components are added vectorially to cancel out distortion factors. This vector addition is brought about by super-modulating each of the aforesaid resultant components by one member of a pair of intermediate frequency components in phase quadrature, and combining the components so derived in an additional modulating circuit, the output of which is passed through a conventional audio detector.

In accordance with another embodiment of the present invention, a saw-tooth frequency modulation having a swing considerably wider than the band width of the aforesaid tuned wave guide or iris at the reflecting satellite station is impressed on the transmitted beam. Speech and ringing signals operate to mechanically detune the resonant wave guide or iris at the satellite station to produce a series of reflected pulses whose respective positions or times of occurrence vary in accordance with the impressed signals. At the central station, these time or position modulated pulses are converted to amplitude modulations and the signals detected in the usual manner.

The aforesaid system may also be modified to provide discrimination between signals received at the central station from satellite stations in the same direction but at different distances therefrom by utilizing time division multiplex operation, whereby a sequence switch whose operation is synchronized with the saw-tooth frequency sweep of the transmitted carrier beam contacts in succession several different signal receiving circuits at the central station corresponding to different transmitting satellite stations.

A further feature of the last-mentioned embodiment provides for the transmission of outgoing signals directed exclusively to selected satellite stations in the same directions but at different distances from the central station. This is achieved by tuning the mechanical modulators in each of the respective satellite stations to a particular frequency band representing, for example, the upper or lower part of the frequency modulating sweep of the transmitted carrier beam. At the central station a sequence switch, whose operation is synchronized with the saw-tooth frequency sweep of the carrier, operates to impress amplitude modulating signals directed to the respective satellite stations on the carrier beam in the desired sequence.

In accordance with another feature of the aforesaid embodiment communication with the central station may be limited exclusively to certain selected satellite stations by limiting the frequency modulating sweep of the transmitted carrier beam to certain selected frequency bands.

Other objects and features and advantages of the invention will be understood from a study of the detailed specification set forth hereinafter, and the attached drawings, in which.

Figures 1, 2, 3:
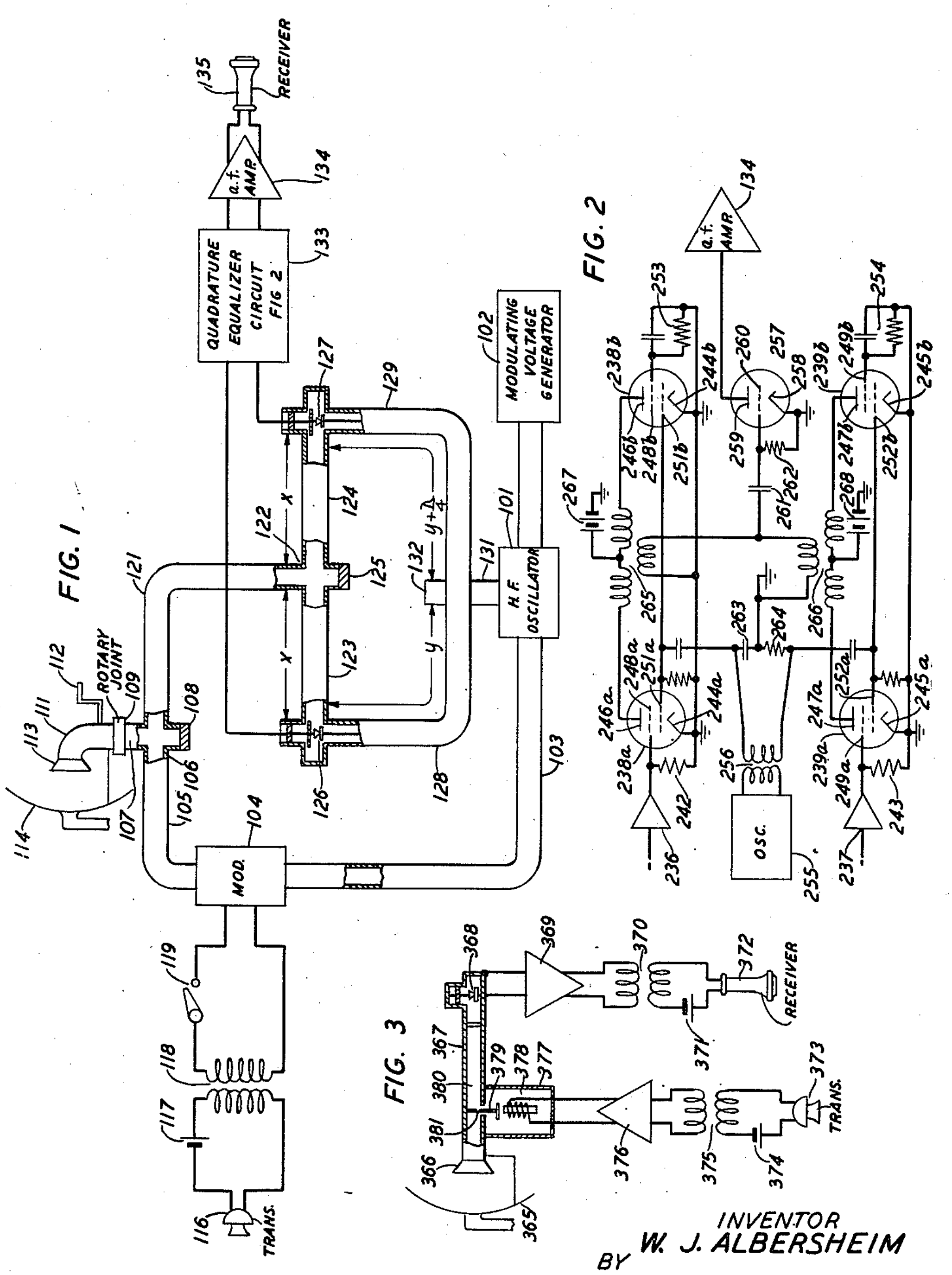
Fig. 1 is a schematic showing of the central station circuit in a microwave beamed telephone system such as described, which includes a quadrature equalizer circuit adapted to reduce signal level fluctuations in homodyne reception.
Fig. 2 is a schematic showing of the details of the quadrature equalizer circuit 133 of Fig. 1.
Fig. 3 is a schematic showing of the circuit arrangements in a typical satellite station in accordance with the present invention.

Let us now consider one embodiment of a microwave telephone system in accordance with the present invention, as set forth in Figs. 1, 2 and 3 of the drawings which respectively show circuit arrangements at a central and satellite station. For simplicity, certain circuit and mechanical details of the system not immediately pertaining to the present invention have been omitted. For a detailed showing of telephone ringing and switching circuits, and an antenna drive whereby the antenna scans to locate calling satellite stations, the reader is referred to the disclosure of S. D. Robertson supra.

When it is desired to establish calling contact between the central station and a selected satellite station, the central station antenna is oriented in the direction of the desired station, whereby the carrier beam transmitted by the central station is intercepted by the antenna of the selected satellite station. When the central station operator speaks to the subscriber at the selected satellite station, speech signals impressed on the telephone transmitter at the central station produce amplitude modulation of the carrier beam directed toward the satellite station. At the satellite station, the signal modulated carrier beam is demodulated by a crystal rectifier mounted in a wave guide chamber, and the audio output signals therefrom impressed across a conventional telephone receiver. When the subscriber at the satellite station speaks to the central operator, speech signals impressed on the telephone transmitter thereat operate an electromechanical device which detunes a resonant wave guide chamber or, alternatively, a resonant iris. This operation impresses modulations on the carrier beam intercepted from the central station, and reflected back thereto. The modulated echo beam received at the central station is homodyned, that is combined with a component of transmitted carrier, passed through detecting and equalizing circuits, and the signal output impressed across the operator's telephone receiver.

As disclosed by Robertson supra, intercommunication between satellite stations is made possible by providing a plurality of transmitting and receiving facilities at the central station. Each beam transmitting and receiving apparatus is equipped with a separate speech modulating equipment, or alternatively, a suitable talking and listening switch such as is well known in the art, which may, in accordance with a further modification, be automatically voice operated in accordance with well-known telephone practice. Thus, a subscriber A receives the unmodulated power from the central station, which he reflects in modulated form. The modulated signal received by the central station from A is detected, amplified and the modulation impressed by means of transfer switches in accordance with well-known telephone technique on the power beamed to B.

It is apparent that discrimination between satellite stations located in different directions from the central station, and privacy of communication between respective satellite stations and the central station is inherent in the system of Fig. 1 as disclosed, providing all of the satellite stations are located in substantially different directions from the central stations.

In the special case, in which several satellite stations are located in the same direction but at different distances from the central station, the aforesaid system of Fig. 1 may be readily adapted to provide discrimination between the respective satellite stations and privacy of communication by the simple expedient of operating each of the different central station beams on a different carrier frequency, and tuning each of the aforesaid satellite receivers to a different one of the carrier beams.

One of the particular features of the embodiment under description is a quadrature equalizer circuit which provides for the reduction of signal level fluctuations inherently present in homodyne reception. This is brought about by several different techniques which may be applied separately or in combination. In one form of the present embodiment a superaudible frequency modulating envelope is preferably, but not necessarily, imposed on the transmitted carrier beam. The signal modulated echo beam received at the central station from the satellite station is separated into two substantially equal components which are combined with respective components of unmodulated carrier waves in phase quadrature. These two mixed components are added vectorially by passing them through twin circuits wherein they are respectively combined with quadrature components of a locally generated intermediate frequency, and the resultant components recombined, thereby canceling out certain undesired distortion factors, and deriving the signal therefrom.

Referring to Fig. 1, the transmitting and receiving circuit at the central station, as embodied in one form of the invention, includes the microwave oscillator 101. In its preferred form this is either a reflex oscillator such as shown, for example, in Bell System Technical Journal, July 1947, page 493, Fig. 18, or an FM magnetron, such as shown for example, in the Journal of the Institute of Radio Engineers, July 1947, page 657. The microwave outputs of both of these types can be frequency modulated by changing a modulating voltage which in the case of the reflex tube affects the repeller voltage, and in the preferred case of a magnetron, controls an electron beam which detunes the magnetron cavity. This modulating voltage which is used in the preferred form of the present embodiment, is supplied by a generator 102 which may be of the well-known relaxation oscillator type in which a condenser shunted by a gas-filled tube is charged up at a nearly constant current rate until the gas-filled tube becomes conducting and the cycle starts again. Since this circuit is entirely conventional and well known in the art, the details have not been shown.

Assume that the oscillator 101 takes the latter form, and is adapted to produce oscillations at a power level of the order of 50 watts, and having a mean wavelength of, for example 3.2 centimeters. It is connected through the wave guide 103 to the input circuit of the conventional microwave amplifier-modulator 104. The output circuit of the amplifier-modulator 104 is connected to the arm 105 of the hybrid junction 106, commonly known as the "magic T," which comprises a four-arm E—H junction such as shown, for example, in Fig. 7 of application Serial No. 581,285, filed on March 6, 1945, Patent No. 2,445,896, by W. A. Tyrrell. In the hybrid junction 106, the two conjugate branches 107 and 108 which are coplanar with the arm 105, are constructed to present substantially equal impedances at the junction, whereby no energy entering the junction through the arm 105 can reach the arm 121. The hybrid junction 106, as constructed, functions to separate the carrier wave output of the amplifier-modulator 104 into two substantially equal components, one of which is absorbed in the impedance matching termination 108, and the other of which passes into the wave guide arm 107. The rotary wave guide joint or choke 109, such as disclosed, for example, in application Serial No. 464,333, Patent No. 2,438,119, filed by A. G. Fox, November 3, 1942, which comprises a fixed member connected to the guide arm 107 and a rotatable member connected to the cylindrical guide arm 111, serves to connect the transmitting circuit to the antenna feed horn 113 located at the focus of the parabolic reflector 114. The feed horn 113 and the parabolic reflector 114 are dimensioned and constructed in accordance with well-known practice to produce a substantially parallel directed beam, the allowable horizontal spread and power of which are functions of the average distance between central and satellite stations. For the purposes of illustration, this distance will here be assumed to be about ten miles. The handle 112 mounted on the rotatable wave guide 111 provides means whereby the central station operator may manually rotate the directed carrier beam through a horizontal arc in order to establish contact with a desired satellite station.

The circuit for impressing speech modulations on the transmitted beam includes the conventional telephone transmitter 116 which is connected in circuit relation with the energizing source 117 and the primary winding of the transformer 118. The secondary winding of the transformer 118 is connected to amplitude modulate the carrier wave input in the microwave amplifier-modulator 104 through a circuit which includes the disconnect switch 119.

The circuit for receiving the modulated reflected carrier beam from one of the satellite stations is connected to the circuit of the antenna 113—114 through the arm 121 of the hybrid junction 106, whereby energy passing into the junction 106 from the arm 107 is separated into two components, one of which passes into the receiving circuit through arm 121, and the other of which passes into the arm 105 and is absorbed in the transmitting circuit.

The wave guide arm 121 is connected to a second hybrid junction 122 which is similar to the hereinbefore described junction 106, and includes an impedance matching termination 125 and conjugate wave guide arms 123 and 124, whereby the received modulated carrier waves passing into the junction 122 are separated into two substantially equal components. The components of modulated carrier wave in the respective wave guide arms 123 and 124 are combined with substantially equal components of transmitted carrier wave 90 degrees out of phase which are derived through a pair of connecting circuits connected to the microwave oscillator 101. These circuits include the wave guide arm 131 connected at one end directly to the output of oscillator 101, and at the other to a hybrid junction having an impedance matching termination 132 and conjugate wave guide arms 128 and 129. The wave guide arms 128 and 129 differ in length by a quarter of the carrier wavelength in the guide and are respectively connected at their other ends to the equilength guide arms 123 and 124. It should be noted that the circuit is equally operative if the X arms 123 and 124 differ by a quarter of the carrier wavelength in the guide and the Y arms are equal, or generally any combination in which 128—123 differ from 129—124 by a quarter wavelength as aforesaid or an odd multiple thereof. At the junction points are disposed the symmetrically positioned crystal rectifiers 126 and 127. The respective output circuits of the crystal detectors 126 and 127 are connected to twin input circuits of the quadrature equalizer circuit 133, the purpose of which is to reduce distortion factors in homodyne reception, and the theory and operation of which will be described fully hereinafter with reference to Fig. 2 of the drawings. The output of the quadrature equalizer circuit 133 is connected across the conventional telephone receiver 135 through a conventional audio amplifier 134.

In order to provide the reader with a better understanding of the structure and operation of the quadrature equalizing circuit disclosed in Fig. 2 of the drawings, the problem of signal level fluctuation which arises in homodyne reception because of slight shifts in the transmitted carrier frequency will now be discussed from a theoretical standpoint.

Let a carrier wave, $$e_t = e_0 \cos \omega t \qquad (1)$$

be radiated by the central station. It arrives at the satellite station located at a distance D with an attenuation A and a delay time $$T = D/c \qquad (2)$$

$c$ being the speed of light in the intervening atmosphere. After passing through subscriber's audio frequency modulator it has approximately the form $$e_s = Ae_0(1+m \cos \alpha t) \cos (\omega t - \omega T) \qquad (3)$$

$m$ being the modulation factor and $\alpha$ the instantaneous frequency. The subscriber-modulated carrier wave $e_s$ is reflected back to the central station where it undergoes a second attenuation A and time delay T and is received as an echo.

$$e_r = A^2 e_0 (1+m \cos \alpha t) \cdot \cos (\omega t - 2\omega T) \qquad (4)$$

or $$e_r = A^2 e_0 (1+m \cos \alpha t) [\cos \omega t \cos 2\omega T + \sin \omega t \sin 2\omega T] \qquad (5)$$

If this echo is mixed with a component of the transmitted carrier $e_t$ and passed through a square-law detector, the derived low frequency component is $$e_{D_1} = k \cdot (1+m \cos \alpha t) \cdot \cos 2\omega T \qquad (6)$$

This has maximum absolute values when $$2\omega T = N\pi \qquad (7)$$

It is zero when $$2\omega T = n\pi \pm \frac{\pi}{2} \qquad (8)$$

Assuming a constant delay time T, gain fluctuation from maximum to extinction occurs for a frequency shift in which $$\Delta\omega = \frac{\pi}{4T} \qquad (9)$$

In this case, $$\frac{\Delta\omega}{\omega} = \frac{\lambda}{8D} \qquad (10)$$

By way of illustration, let the distance between the central station and a selected subscriber station be ten miles which equals $$1.6 \cdot 10^6 \text{ cm.} \qquad (11)$$

Assume that the carrier wave has a wavelength equal to 1.25 centimeters. In such case, extreme fades occur for $$\frac{\Delta\omega}{\omega} = \frac{1.25}{8 \cdot 1.6 \cdot 10^6} = 10^{-7} \qquad (12)$$

Identical considerations apply for small variations $\Delta T$ of the delay time T. To keep fades within one decibel the frequency modulation by hum, noise, etc., and the path variation due to atmospheric conditions must be kept within a small fraction of $10^{-7}$, which is impractical.

Consider now the operation of a square-law detector which mixes the echo with a carrier shifted by 90 degrees. If its efficiency is equal to that of the first detector it has the low frequency output $$e_{D_2} = K(1+m \cos \alpha t) \sin 2\omega T \qquad (13)$$

It should be noted that $e_{D_2}$ is zero when $e_{D_1}$ is at a maximum and vice versa. There is, however, nothing gained by simply mixing $e_{D_1}$ and $e_{D_2}$ in any arbitrary proportions, as the following shows.

Let $$e_m = M_1 e_{D_1} + M_2 e_{D_2} \qquad (14)$$

one may write $$M_1 = M\cos\Psi \qquad (15)$$

$$M_2 = M\sin\Psi \qquad (16)$$

with $$M = \sqrt{M_1^2 + M_2^2} \qquad (17)$$

and $$\Psi = \tan^{-1} M_2/M_1 \qquad (18)$$

$$e_m = Mk(1+m\cos\alpha t)(\cos 2\omega T\cos\Psi + \sin 2\omega T\sin\Psi) \qquad (19)$$

$$e_m = Mk(1+m\cos\alpha t)\cdot\cos(2\omega T - \Psi) \qquad (20)$$

which is just as subject to fluctuations as the single detector outputs.

The fluctuations can be canceled if it is possible to add $e_{D_1}$ and $e_{D_2}$ vectorially. The desired result is $$e_v = |e_{D_1} + je_{D_2}| = |\sqrt{e_{D_1}^2 + e_{D_2}^2}| = K(1+m\cos\alpha t) \qquad (21)$$

The aforesaid vectorial addition cannot be performed directly because the function $$(1+m\cos\alpha t)$$

includes direct current and an alternating signal frequency spectrum of many octaves. It can, however, be achieved by modulation with an intermediate carrier frequency $\nu$ which is high enough to make the audio spectrum a small fraction of $\nu$.

The equalizing circuit 133 of Fig. 1 which is shown in detail in Fig. 2 operates on a theory which is based on the considerations set forth in the foregoing paragraphs.

Referring back to the circuit of Fig. 1, the modulated carrier wave picked up by the antenna 113—114 enters the receiving circuit through the hybrid junction 122 and is divided into two substantially equal components which pass into the branching arms 123 and 124.

Equal components of unmodulated carrier wave in phase quadrature, which are derived from the unequal wave guide arms 128 and 129 are mixed with the modulated components in the arms 123 and 124, and the mixtures impressed on the respective crystal detectors 126 and 127, the low frequency output currents from which have the forms $e_{D_1}$ and $e_{D_2}$ respectively, which are given by Equations 6 and 13 hereinbefore.

Referring to Fig. 2, output currents from the detectors 126 and 127 are passed into the quadrature equalizing circuit 133 of Fig. 1 through the matched amplifiers 236 and 237. The outputs of the amplifiers 236 and 237 are respectively connected across the resistances 242 and 243 connected between ground and the control grids 248 and 249 of the modulator tubes 238*a* and 238*b*. These tubes respectively include cathodes 244*a* and 245*a*, plates 246*a* and 247*a*, and suppressor grids 251*a* and 252*a*. It should be noted that no mention is made in this description to the use of grid biasing voltages, inasmuch as these may be adjusted for optimum operation in a manner well known to the art. The input currents to the modulating tubes 238*a* and 239*a* therefore have the form of Equations 6 and 13. Subject to certain limitations which will be discussed hereinafter, the next feature in accordance with the foregoing theory is the provision of two carriers of equal frequency and amplitude but with a 90-degree phase difference. For this purpose, the conventional oscillator 255, a source of intermediate frequency sine wave carrier is utilized.

The intermediate frequency carrier produced by the oscillator 255 may have any frequency which is large compared to the highest audio frequency, for example, $$e_{13} = e_0\sin\nu t;\ \text{where } \nu \text{ is greater than } 3\cdot10^5 \qquad (22)$$

The output of this intermediate frequency source is coupled to a quadrature network one branch of which is a pure resistance 264, and the other branch of which is a pure capacitive reactance 263 of equal absolute impedance such that $$C = \frac{1}{R\omega} \qquad (23)$$

The general requirement is that $$z_1 = \pm jz_2 \qquad (24)$$

where $z_1$ and $z_2$ represent the capacitive and inductive reactances. Then, if the voltage drop in one branch is represented by $$e_{11} = k_{14}\sin(\nu t + \varphi) \qquad (25)$$

the voltage across the other branch will be represented by $$e_{12} = k_{14}\cos(\nu t + \varphi) \qquad (26)$$

These voltages are impressed upon the suppressor grids 251 and 252 of the respective modulator tubes 239*a* and 238*a*. In order to make the envelopes of the modulated waves proportional to the instantaneous values of the signals without any additive direct current biases, the modulation must be of the balanced type. In the circuit of Fig. 2, the balance is obtained by tubes 238*b* and 239*b* which respectively include control grids 248*b*, 249*b*, suppressor grids 251*b*, 252*b*, cathodes 244*b*, 245*b*, and plates 246*b*, 247*b*. The aforesaid tubes 238*b* and 239*b* have the same intermediate frequency input through their respective suppressor grids 251*b* and 252*b* as tubes 238*a* and 239*a*, but no signal frequency input. The control grids 248*b* and 249*b* are held at a fixed potential by identical circuits 253 and 254 which each comprise a resistance and condenser connected in parallel. For zero alternating frequency signal, the intermediate frequency outputs of the tubes 239*a* and 239*b* are canceled by the balanced transformer 265 and the outputs of the tubes 238*a* and 238*b* by transformer 266.

The output voltages of transformers 265 and 266 are represented by $$e_{18} = k_{15}(1+m\cos\alpha t)\cos 2\omega T\sin(\nu t + \varphi) \qquad (27)$$

$$e_{19} = k_{15}(1+m\cos\alpha t)\sin 2\omega T\cos(\nu t + \varphi) \qquad (28)$$

Their sum, which is impressed on the grid 260 of the detector tube 257 through a circuit including the condenser 261 and the resistance 262 connected between grid 260 and ground is $$e_{15} = k_{15}(1+m\cos\alpha t)\sin(\nu t + \varphi + 2\omega T) \qquad (29)$$

The last term of (29) has a constant amplitude, and is merely phase modulated by $2\omega T$. If tube 257 represents a linear amplitude detector, its output is represented by $$e_{16} = k_{16}\cdot(1+m\cos\alpha t) \qquad (30)$$

which is free of the fading fluctuation.

The foregoing theory is based on the assumption that the relative magnitudes of voltages $e_{D_1}$ and $e_{D_2}$ are impressed upon the modulating tubes 238*a* and 239*a* without distortion. If the product $\omega T$ in Equations 6 and 13 happens to be constant for a length of time comparable to signal frequencies, both $e_{D_1}$ and $e_{D_2}$ contain direct current components due to the additive 1 in the bracketed terms. In this case, amplifiers 236 and 237 must be capable of amplifying without distortion a frequency range including direct current and extending to the highest frequency of the signal plus the carrier phase fluctuations ($\omega T$).

In the preferred form of the present embodiment, however, it is desirable to use alternating current amplifiers for 236 and 237 which are preferable on account of the higher gains and greater stability thereby obtainable. Their use is permissible if the direct current components are eliminated from $e_{D_1}$ and $e_{D_2}$ by making sin $2\omega T$ and cos $2\omega T$ alternating functions, which is achieved by frequency modulating the carrier $\omega$. The amount of modulation required is quite small, since, in accordance with Equation 12 a frequency modulation of 1 in $10^7$ changes $2\omega T$ by 90 degrees $$\left(\text{or } \frac{\pi}{2}\right)$$

whereas a modulation of about $3\cdot10^{-6}\omega$ is ample to produce a multiple alternation of both cos $\omega T$ and sin $\omega T$.

The preferred form of modulation to be impressed on the carrier wave beam is a saw-tooth frequency modulation which makes both cos $\omega T$ and sin $\omega T$ sinusoidal functions throughout the sweep cycle. If the modulating frequency is within the signal frequency range, the products of cos $\omega T$ and of sin $\omega T$ by $(1+m \cos at)$ may again contain direct current components. Hence, in the preferred form of this embodiment, the modulating frequency is higher than the highest signal frequency. It should, however, be as low as possible in order to simplify the amplifier design. Hence, a modulating frequency of 6,000 to 8,000 cycles per second is preferred for speech signals.

Let $$\omega=\omega_0+\Delta\omega f(\mu t) \qquad (31)$$

with $$\frac{\Delta\omega}{\omega}\doteq 3\times10^{-5} \qquad (32)$$

and $$\mu\doteq 6{,}000 \text{ cycles per second} \qquad (33)$$

and where $f(\mu t)$ indicates a saw-tooth function which increases linearly in proportion to time through nearly the entire cycle and then returns to the starting frequency in a nearly instantaneous back sweep.

There are, of course, many modifications of the equalizer circuit described in the foregoing pages which will achieve the same result. For example, at the input circuits one may interchange terminals so that the carrier components are supplied to the crystals 126 and 127 in phase and the echo components in quadrature. Similarly, the auxiliary intermediate frequency carrier may be supplied in phase to the two balanced modulators 238*a* and 239*a* and the outputs of the modulator circuits added in quadrature.

The circuit of Fig. 2 or an equivalent may be combined with other circuit elements which have been used successfully in diversity reception, such as, for example, a circuit adapted for joint automatic gain adjustment of the separate amplifiers 236 and 237 under control from the combined signal frequency output $e_{16}$ as given in Equation 30. The system of reception described in the foregoing paragraphs may also have other applications. In the "enhanced carrier" method of double sideband amplitude modulation reception, it may be difficult to keep the locally supplied or enhanced carrier in correct phase relation to the sidebands. Distortion and gain fluctuations may be avoided by double receiving circuits and quadrature addition such as described. In diversity receivers the audio signals received at each antenna by the enhanced carrier method may be added in quadrature by a second application of the method here described.

Fig. 3 of the drawings shows one embodiment of a circuit arrangement at the satellite station for modulating the transmitted carrier beam, which will now be described in detail.

Figure 4A:
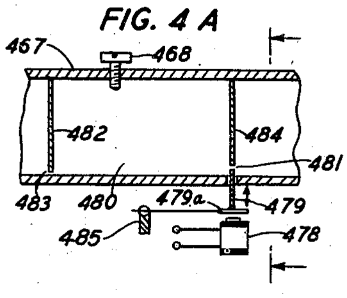
Fig. 4A shows a plan view of an electromechanical modulating device comprising a resonant wave guide cavity including a fixed iris and a variable iris.
Figure 4B:
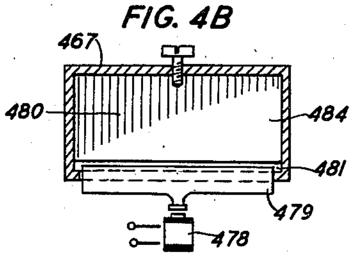
Fig. 4B shows a cross-sectional view of the wave guide and variable iris of Fig. 4A.

The receiving antenna comprises the parabolic reflector 365, at the focus of which is supported the feed horn 366. The antenna 365—366 is similarly constructed to the central station antenna 113—114, except for the fact that the former has a fixed direction of transmission and reception directed toward the central station which lies on the arc swept by the scanning carrier beam from the central station antenna. The antenna feed horn 366 is connected to the wave guide 367, which in one embodiment may comprise a resonant chamber such as shown in Figs. 4A and 4B of the drawings, which will be described in detail hereinafter. The wave guide chamber 367 is terminated by a conventional crystal rectifier 368, the output of which is connected through an audio amplifier 369 to the transformer 370 which is connected across a conventional telephone receiver 372 and in series with the energizing battery 371.

The subscriber's speech transmission circuit includes the telephone transmitter 373 in series with the local battery 374, and the primary winding of the transformer 375. The secondary winding of the transformer 375 is connected through the conventional audio amplifier 376 to the energizing winding of the electromagnet 378, enclosed in the metallic chamber 377. The electromagnet 378 is constructed to actuate the movable member 379 to vary the dimensions of the iris 381 thereby changing the tuning of the cavity 380 in the wave guide 367 and producing modulations of the reflected carrier waves in accordance with the impressed speech signals. The nature of the modulations impressed on the carrier waves reflected back to the central station in a directed beam is dependent upon structural details of the wave guide chamber 367 and the deformable iris 381 therein contained or an equivalent arrangement of elements which may take a variety of forms, several of which are shown in Figs. 4A—4E of the drawings, and which will now be described in detail.

Figs. 4A and 4B of the drawings, respectively, show the plan view and cross-sectional view of one form of the resonant wave guide chamber 367 which is constructed to have an iris of fixed dimension, and an iris of variable dimension.

The wave guide 467 corresponding to the wave guide 367 of Fig. 3 includes a metallic chamber 480 of rectangular cross-section which is formed by two metallic partitions 482 and 484. The chamber 480 is nearly closed at one side by a fixed iris comprising the metallic partition 482 and a narrow aperture 483, the small dimension of which is at right angles to the electric vector of the microwave energy in the wave guide. At the other end of the chamber 480 the variable iris comprises the fixed partition 484 and a movable partition 479 which provide between them a narrow slit of variable width 481, which also has its narrow dimension in the direction of the electric microwave vector. The length of the chamber 480 included between the partitions 482 and 484 is approximately a half wavelength of the mean carrier wave in the guide. Tuning is provided by means of the adjustable stub member 468 inserted in one of the walls of the wave guide 467.

The movable iris 479 is appended to an armature 479*a*, which moves under the influence of speech currents passing through the electromagnet 478. The armature 479*a* is aligned by the pivot 485 to maintain it in proper operating position. The combination of the elements described in the foregoing paragraph strongly reflects substantially all of the microwave energy, with the exception of that in a narrow resonance region wherein it passes a substantial fraction of the impressed energy. The amount of this energy which is passed, and therefore not reflected back, varies with the width of the variable slit 481.

Figure 4C:
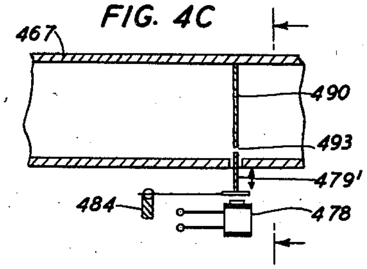
Fig. 4C shows a plan view of an alternative form of electromechanical modulating device which comprises a single resonant iris.
Figure 4D:
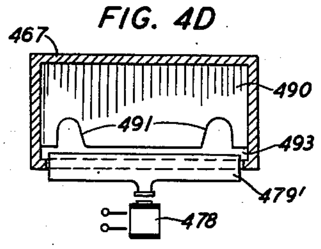
Fig. 4D shows a cross-sectional view of the iris of Fig. 4C.

In the structure shown in plan and cross-sectional views in Figs. 4C and 4D, the fixed iris is omitted from the wave guide 467. The variable iris comprises a fixed partition 490 and a variable partition 479' and an included aperture of variable size 493. The fixed partition 490 includes a pair of notches in its lower edge adjacent the aperture 493 which are respectively disposed near the two short walls of the wave guide 467.

The resulting slit 493 is narrow over most of its length except where it is widened by notches in the fixed portion, the narrow dimension of the slit being in the direction of the electrical vector of the impressed microwaves. The widened portions of the slit 493 produce an approximately fixed inductive susceptance, which is in parallel with a variable capacitative susceptance due to the variable narrow portion of the slit. In the resonant region these parallel susceptances cancel each other so that the iris imposes little obstruction to the passage of the carrier waves. At all other frequencies either the capacitive or the inductive susceptance predominates so that most of the carrier wave energy is reflected.

The method of operation of the structure of Figs. 4C and 4D is similar to that described with reference to the structure of Figs. 4A and 4B.

Figure 4E:
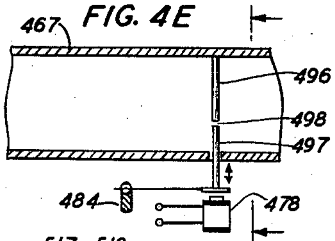
Fig. 4E shows a plan view of another alternative form of electromechanical modulating device, in which an antiresonant iris is formed by slender fixed and movable stub members.
Figure 4F:
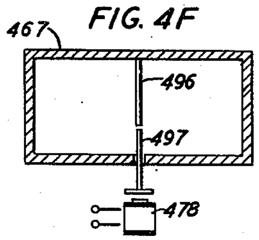
Fig. 4F shows a cross-sectional view of the iris of Fig. 4E.

Figs. 4E and 4F show plan and cross-sectional views of an antiresonant device which acts in an inverse manner to the modulating devices described in the foregoing paragraphs.

The device here shown passes most of the energy freely at all frequencies except near the resonant frequency where it reflects nearly the entire energy. This is brought about by replacement of the fixed and movable iris elements of the foregoing figures by slender fixed and movable stubs 496 and 497 which form the gap 498. These are high impedance inductive elements which are preferably in line with the central wave guide axis parallel with the electric vector of the impressed microwaves. At the resonant frequency, the stubs 496 and 497 are series resonant with the capacitive reactance 498 of the small gap 498 included between them, and thus approach a short circuit across the wave guide 467. It is apparent that all of the structures shown in Figs. 4A–4F can take a variety of forms without deviating from the design principle.

It should be understood that a resonant cavity such as disclosed herein and electromechanically modulated as heretofore described, may be of high Q, for example of the order of $10^4$—$10^5$, that the iris slit thereof may be narrowed down to the order of 0.120 inch wide by 0.010 inch high, and that modulation may be produced essentially by varying the very loose coupling to said high Q cavity aforesaid.

The resonant devices shown in Figs. 4A–4D are preferred for homodyne reception in a system such as described with reference to Figs. 1, 2 and 3, hereinbefore, whereas the antiresonant device shown in Figs. 4E and 4F is preferred for use in a system employing pulse position modulation such as will be described with reference to Figs. 5A and 5B hereinafter. However, it is to be understood that both resonant and antiresonant types of reflector modulator can be used interchangeably.

Figure 5A:
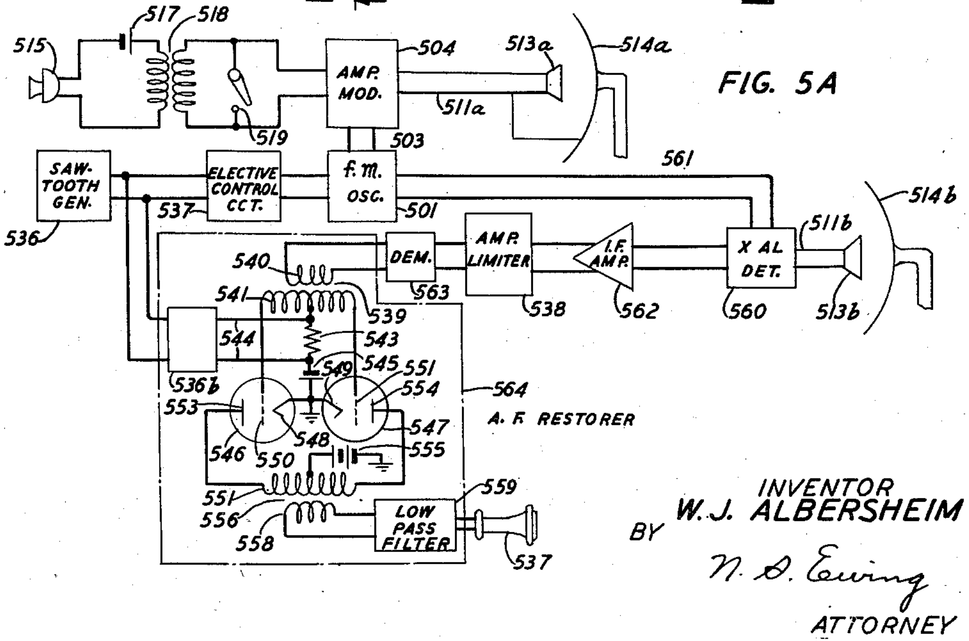
Fig. 5A shows a central station circuit arrangement utilizing equipment adapted to transmit a frequency modulated carrier beam, and including a receiving circuit adapted for the reception of pulse position modulated signals from the satellite stations.

Fig. 5A of the drawings shows a modified embodiment of the present invention, preferably adapted for use in conjunction with satellite stations employing electromechanical modulators of the types described with reference to Figs. 4A–4F, whereby the signal reflected from the satellite station is pulse position modulated. Pulse position modulation, hereinafter called p. p. m., has various advantages with regard to signal-to-noise ratio and selective differentiation between a multiplicity of subscribers on a time division basis which are known to the art, and such as are described in detail in "Pulse Time Modulation," Electrical Communication, Techincal Journal of International Telephone and Telegraph Company, 1944, vol. 22, No. 2, page 91.

In the embodiment here considered with reference to Fig. 5A, a saw-tooth frequency modulating sweep is impressed on the transmitted carrier wave.

It is assumed that the electromechanical modulators used at the satellite station are so sharply tuned that they increase or decrease the percentage of energy reflected back to the central station only during a small fraction of the saw-tooth FM sweep impressed upon the transmitted carrier. They will therefore return an echo with positive or negative amplitude pulses; the relative time or "position" of these pulses depending upon the tuning frequency of the satellite modulator.

Before describing the circuit details of Fig. 5A, the theory of this modification will be briefly discussed. Referring to Equation 6 of the previous discussion with reference to Fig. 2 hereinbefore, it is seen that the output of a homodyne square-law modulator is the product of the desired signal multiplied by a factor $\cos 2\omega T$.

In accordance with the embodiment to be presently described, the carrier frequency $\omega$ is modulated by a saw-tooth wave of frequency $\mu$. During nearly the entire period $$\omega=\omega_0+\Delta\omega\cdot\mu t \qquad (34)$$

According to Equation 34 above, the transmitted carrier frequency increases at the rapid rate of $\Delta\omega\mu$ per second. Let the maximum detuning obtainable by the satellite station's modulator be $\delta\omega$; then the instantaneous detuning is $$\delta\omega\cdot m\cos\alpha t \qquad (35)$$

where $m$ is the modulation coefficient and $\alpha$ the instantaneous audio frequency. $\alpha$ is a very low frequency compared to the envelope frequency of the saw-tooth frequency swing. Hence the deviation of the satellite tuning can be regarded as quasistationary. Since the saw-tooth frequency sweep extends over a wider range than the satellite detuning, it will catch up with the satellite's momentary tuning frequency after a time interval $$\delta t\frac{\delta\omega}{\mu\Delta\omega}m\cos\alpha t \qquad (36)$$

which is proportional to the detuning and hence, to the satellite's audio signal. From the above, it is apparent that true "pulse time modulation" or p. p. m. occurs.

The embodiment shown in Fig. 5A and designed to operate in accordance with the foregoing theory, includes the following components.

An FM oscillator 501, which is substantially similar to oscillator 101 described with reference to Fig. 1 hereinbefore, is frequency modulated at a superaudible frequency by means of the saw-tooth voltage generated in the conventional saw-tooth generator 536, which may assume a form substantially similar to the modulating voltage generator 102 also described with reference to Fig. 1. The modulating voltage, and thereby the frequency deviation or modulating index impressed on the output of the FM oscillator 501, may be controlled by a variable gain amplifier or attenuator 537 responsive to the output of the saw-tooth generator 536. Circuit element 537 which has been designed the "electronic control circuit" is a convenient circuit addition, but is not required for correct operation of the circuit.

The major part of the output of the oscillator 501 is passed for transmission through a wave guide 511*a* which is connected to a directional antenna comprising a feed horn 513*a* located at the focus of the rotatable parabolic reflector 514*a*. When speech signals are to be transmitted to the subscriber, the oscillator output is amplitude modulated by a conventional speech input equipment including a conventional telephone transmitter 515 which is connected in series with the energizing source 517 and the primary winding of the transformer 518. The secondary winding of transformer 518 is connected to amplitude modulate the carrier generator 501 through a circuit which includes the short-circuiting disconnect switch 519. The conventional amplitude modulator schematically shown at 504 and which is connected to the FM oscillator 501 by the line 503, may comprise a series connection to an oscillator voltage supply or any other modulating means known to the art.

When echo signals from a satellite station are to be received, switch 519 is in disconnect position so that the carrier wave sent to the satellite is free from audio frequency amplitude modulating. The echo signal is received by the rotatable parabolic reflector 514*b* which is mechanically coupled to the transmitting antenna 513*a*—514*a*, the entire assemblage being directed towards the satellite station. The reflector 514*b* focusses the incoming microwaves onto feed horn 51*b* whence they pass through wave guide 511*b* to crystal detector 560. A small portion of the output of FM oscillator 501 also passes to crystal detector 560 through wave guide 561. In the crystal detector 560 the output of the FM oscillator 501 and the echo signal are combined and demodulated, forming an intermediate frequency output comprising the desired pulse position modulated signal which is amplified by a broad band intermediate frequency amplifier 562.

Assuming that the modulating equipment at the satellite stations is of the electromechanical type, such as described, for example, with reference to Figs. 4A–4E, the intermediate frequency modulated signal at the output of the amplifier 562 consists of separate pulses of varying time position. Their amplitude is subject to fluctuations due to fading, amplifier gain fluctuations, etc. These gain fluctuations are eliminated by passing the pulsed signals through a limiter, or "chopper" 538 of a form well known in the art which produces intermediate frequency modulated pulses of substantially equal shape and amplitude. These modulated pulses are then demodulated in the demodulator 563 which may comprise a conventional type circuit having linear or any arbitrary non-linear characteristic. The demodulated pulses are then passed through a plurality of elements comprising the circuit 564 which jointly perform the function of audio frequency restorer such as described in the above-quoted International Telephone and Telegraph publication entitled "Pulse Time Modulation." Although the aforesaid circuit elements cooperate in a manner well known to the art, such as described in the publication supra, their preferred form is described here in detail.

The output of demodulator 563 is connected to pass through the primary winding 540 of transformer 539; the push-pull secondary winding 541 of 539 generates output voltages which are connected to the grids 550 and 551 of the variable gain push-pull amplifier tubes 546 and 547. The respective plates 553 and 554 of the tubes 546 and 547 are connected to the push-pull terminals of the primary winding of the audio frequency output transformer 556, the mid-point of which is connected to the voltage source 555, and the other side of which is grounded. The cathodes 548 and 549 of tubes 546 and 547 are also grounded. The grids 550, 551 receive a fixed bias from direct current voltage source 545 and a variable bias from the current flowing through resistance 543 which is connected between source 545 and the mid-point of secondary winding 541. The current flowing through 543 is supplied through line 544 either directly from saw-tooth generator 536 or preferably from a secondary saw-tooth generator 536*b* which is triggered by and hence synchronized with 536 but with a time delay adjusted in such a manner that its voltage change is proportional to the saw-tooth carrier frequency change of the returned echo rather than of the transmitted carrier.

The gain of tubes 546 and 547 is proportional to the voltage drop in 543; hence the output current pulse amplitude in transformer winding 557 is proportional to the time shift of the pulse and thus to the amplitude of the speech signal transmitted from the satellite station. The secondary winding 558 of audio frequency output transformer 557 is connected to a low-pass filter 559 which suppresses the pulse character of the signal and smooths it out into a normal audio frequency signal which is then impressed upon the conventional telephone receiver 535.

It is assumed that the transmitting and receiving antennas of Fig. 5A, which are mechanically coupled together, are mounted for rotation through a horizontal arc for alignment with a selected satellite station such as disclosed, for example, with reference to Fig. 1 hereinbefore. Moreover, the said antenna assemblage may be electrically driven in the manner described with reference to Fig. 1 of the Robertson application supra.

It is apparent, as mentioned with reference to Fig. 1 hereinbefore, that discrimination between satellite stations in substantially different directions from the central station is inherent in the system. However, if the satellite stations are located in the same direction but at different distances from the central station, the problem of identification and selective communication necessitates different arrangements than those used in the systems of Figs. 1 and 5A described hereinbefore.

One may treat subscribers located at different distances but in the same direction from the central station as participants in the same party line in which case discrimination is unnecessary except for selective ringing. Such selective ringing may make use of mechanical, acoustical or electrical resonances or filters to avoid ringing the unwanted subscriber, activating his equipment and thus consuming power of his small local battery.

Conversely, the subscriber's calling equipment should have a selective characteristic so that the call could be charged to him and not to another in the same beam. All these selective ringing means are well known and understood.

In addition to distinguishing between different subscribers in the special case under consideration, it may be desired to provide privacy in the conversations between the different stations, both for outgoing and return signals, the latter being considered as two separate problems.

Selective transmission for the outgoing signals between central and a desired subscriber's station can be achieved very simply in a system such as shown in Fig. 5A, in which the carrier beam is frequency modulated, by making the subscriber's receiving equipment responsive to only a part of the frequency band over which the saw-tooth frequency modulation of the transmitter sweeps. This can be done either by inserting band-pass filter in the receiving circuit at the subscriber's station, or preferably by means of the resonant chamber 380 or resonant iris such as shown in Fig. 4D already incorporated in the receiver. One simply specifies that the subscriber's modulation which varies the resonant frequency, that is, the acceptance frequency of chamber 380 or iris 490 be limited to part of the transmitter's sweep frequency range. Then if subscriber A is limited to the lower half of the maximum sweep range and subscriber B to the higher half of that range, discrimination in favor of A or B respectively is obtained at the central station by either of two possible techniques, namely, (1) limiting the transmitter frequency modulating sweep to the lower, or to the higher half of the maximum swing; or (2) utilizing the full saw-tooth swing for the transmitted signal, but applying speech modulation to the central station transmitter only during a selected part of the saw-tooth swing.

The first method of station selective transmission referred to in the foregoing paragraph produces a two-way limiting signal discrimination at the subscriber's station; because when a subscriber is prevented from receiving any modulated or unmodulated carrier from the central station he cannot modulate it and send a return message or call to the central station.

The second method described above can be used for one-way receiving discrimination at the subscriber's station, inasmuch as messages can be sent by the subscriber to the central station, although not received by him from the central station.

In addition to the methods for selectively transmitting signals, referred to in the foregoing paragraphs, several methods have been devised for the selective or separate reception at the central station of incoming signals from different satellite stations in the same direction but at different distances from the central station.

A frequency division multiplex system for accomplishing the above is disclosed in Fig. 2 of application Serial No. 54,431 to S. D. Robertson supra.

Figure 5B:
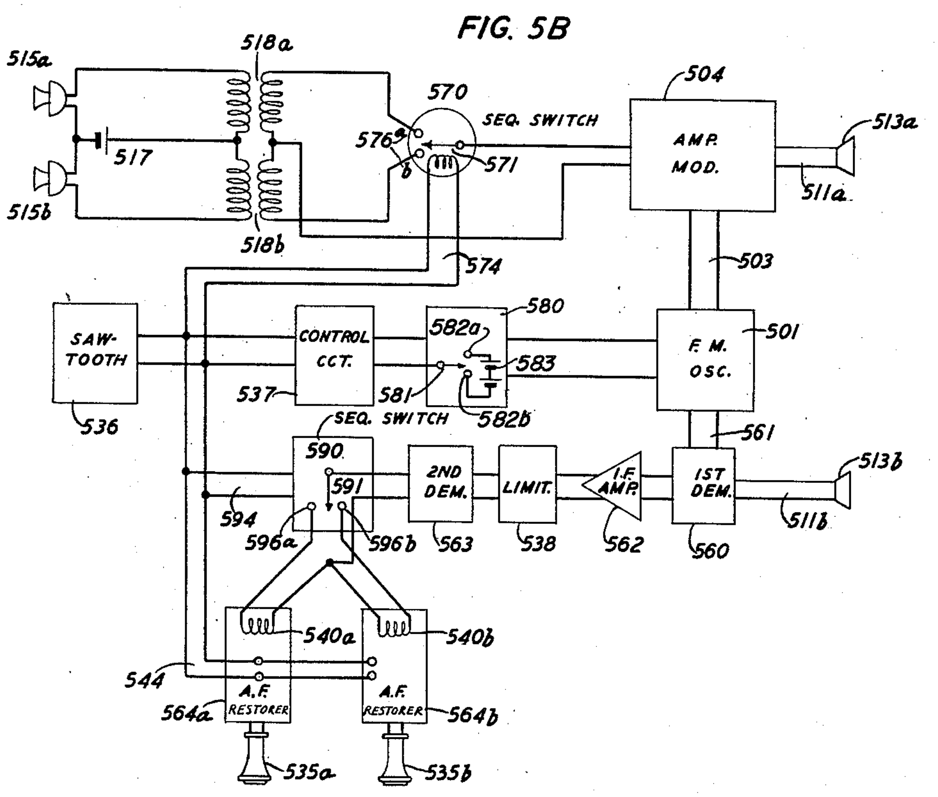
Fig. 5B shows a modification of the circuit of Fig. 5A adapted for time division multiplex operation to distinguish between subscribers located at different distances from the central station.

An alternative system utilizing time division multiplex operation wherein several echophone subscribers located at different distances but in the same beam direction are enabled to talk simultaneously and without interference to several different subscribers who are connected to the echophone central station by conventional wire lines or equivalent, is disclosed in Fig. 5B of the drawings.

The system disclosed in Fig. 5B is a modification of the system hereinbefore described with reference to Fig. 5A, which is adapted to combine station selective transmission as referred to hereinbefore with time division multiplex reception.

In the system of Fig. 5B, the outgoing speech modulations are applied to the transmitter successively by a sequence switch which directs them to the different echophone subscribers on a frequency basis in a manner which will be explained hereinafter. The incoming echoes are separated by a second sequence switch, on a distance basis. In the system illustrated and explained with reference to Fig. 5B, elements having the same numbers as in Fig. 5A are substantially the same in structure and function as described with reference thereto.

The elements 515*a* and 515*b* are conventional telephone transmitters of two wire line subscribers *a* and *b* who wish to talk to echophone subscribers A and B, respectively. Assume, for example, that A is located nearer than B to central station and that his microwave receiver is tuned in the manner described to the lower half of the sweep frequency range, whereas B's receiver is tuned to the upper half of the range. The central station circuit as shown in Fig. 5B is adapted to direct signals to either subscriber A or B exclusively, by limiting the transmitter FM sweep respectively to the lower or upper half of its maximum swing.

This is preferably achieved by modifying the central station circuit of Fig. 5A to insert a biasing circuit between the control circuit 537 and the FM oscillator 501 as shown in one form by the device 580. This comprises a selector switch 581 which may be operated to make contact with one of several taps 582*a*, 582*b* of battery 583 and thereby inserting different biasing voltages in series with the output voltage of the control circuit 537. If, for example, the swing is to be limited to the lower half of the maximum saw-tooth swing, the swing is reduced to ½ by inserting a 6-decibel loss in the control circuit 537. Simultaneously, switch 581 is connected to tap 582*a* which inserts a negative bias equal to one-quarter of the total saw-tooth output of the generator 536.

The speech signals from *a* and *b* go to terminals 576*a* and 576*b* of the sequence switch 570, to be described hereinafter, operation of the switch arm 571 of which is synchronized with the saw-tooth voltage 536 by the connecting wires 574. The output of 570 is connected to amplitude modulator 504; hence, during the lower part of each frequency swing the amplitude modulator is activated by speech voltages from the speech transmitter 515*a* and during the higher part, from the speech transmitter 515*b*.

The pulse position modulated microwave energy returning from the echophone satellite stations is demodulated by the crystal demodulator 560, passes through the wide band intermediate frequency amplifier 562, the amplitude limiter 538, and the second demodulator 563. The amplitude limiter 538 removes the superimposed amplitude modulation impressed by subscribers *a* and *b* so that only the pulse position modulations impressed by echophone subscribers A and B remain. These are separated by sequence switch 590 similar to the switch 570, as will be described hereinafter, operation of which is synchronized with the saw-tooth swing by wires 594. Switch arm 591 of the switch 570 makes successive connections with contacts 596*a* and 596*b*, which in turn are connected to audio frequency restorers 564*a* and 564*b* which are similar to the circuit 564 of Fig. 5A. The aforesaid restorers 564*a* and 564*b* are respectively connected to the telephone receivers 535*a* and 535*b* of the wire line subscribers *a* and *b*. Inasmuch as subscriber A is closer to the central station, his echoes arrive earlier and are connected to 564*a* as desired.

Figure 5C:
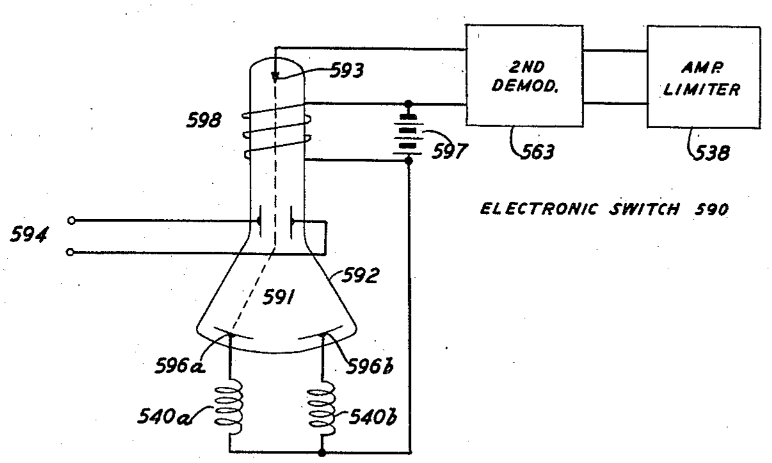
Fig. 5C is a detailed showing of the electronic switches 570 and 590 of Fig. 5B.

The sequence switches 570 and 590 can be of any known type provided they are adapted to operate fast enough to follow the superaudible saw-tooth sweep of the generator 536. One preferred form of these switches is shown in detail in Fig. 5C of the drawings, which is numbered to indicate connections to switch 590, but may be similarly applied to switch 570. The switching is performed in a conventional cathode-ray tube 592, which comprises a cathode 593 adapted to emit an electron beam 591 which, being focussed in the known manner, for example by solenoid 598, serves as switch arm contacting in succession two anodes 596*a* and 596*b* which serve as the sequence contacts. The aforesaid anodes 596*a* and 596*b* receive biasing voltage through battery 597 and complete the circuit through the input coils 540*a* and 540*b* of audio frequency restorers 564*a* and 564*b*. The beam is deflected by condenser plates 595 which are activated by the saw-tooth voltage from the generator 536 through wires 594.

It will be apparent to those skilled in the art that the systems described in the foregoing pages may take numerous other forms not shown herein which are within the scope of the present invention; and that embodiments of the present invention are accordingly not limited to the use of any particular element or combination of elements shown by way of illustration herein.

What is claimed is:

1. A communication system comprising in combination a central station and a plurality of satellite stations at different distances but in the same direction from said central station, means at said central station for generating and radiating a plurality of carrier wave beams of different frequencies toward said satellite stations, radiation receiving and reflecting means at each of said satellite stations comprising an electromechanical device including a mechanically variable component, each said device tuned to a different frequency carrier wave, a signaling circuit in each of said satellite stations connected to control said component to vary the tuning of said device in accordance with signal currents, and receiving means at said central station for separately receiving the signal bearing carrier beams reflected from each of said satellite stations and deriving the signals therefrom.

2. A communication system in accordance with claim 1 in which each of said receiving means comprises in combination a pair of circuits for separating the signal bearing carrier wave energy of a respective one of said beams into two components, modulating and detecting means included in each of the circuits of said pair, conducting circuits connected between each of said modulating and detecting means and the output of the said generating means having a frequency corresponding to said respective beam, said conducting circuits having electrical lengths that differ by approximately a quarter wavelength in the frequency of said respective carrier beam whereby the signal bearing components are respectively combined with components of unmodulated carrier waves to produce resultants in phase quadrature, and a separate equalizing circuit responsive to the outputs of each respective pair of modulating and detecting means, each said equalizing circuit comprising means for vectorially adding a respective pair of said resultants, and means responsive to the output of each said equalizer circuit for deriving the impressed signal therefrom.

3. A communication system comprising in combination a central station and a plurality fo satellite stations, a generator of carrier oscillations at said central station, means in energy transfer relation with said generator for varying the frequency of said oscillations through a substantially repetitive cycle, means responsive to said oscillations to radiate a beam thereof directed to one of said satellite stations, antenna means at said satellite station disposed in the path of said beam, an electromechanical device connected to said antenna comprising a wave guide having a mechanically variable component whereby to reflect and absorb varying amounts of the energy of said beam, a signaling circuit connected to vary the position of said mechanically variable component in said wave guide in accordance with signal voltages, and means at said central station to receive and demodulate the carrier wave energy reflected from said satellite station and to derive the signal therefrom.

4. A system in accordance with claim 3 in which said electromechanical device comprises a wave guide cavity, and said mechanically variable component comprises an iris of variable dimension mounted therein, said cavity constructed to be resonant to the frequency of said carrier oscillations for at least one position of said iris.

5. A system in accordance with claim 3 in which said electromechanical device comprises an iris of variable dimension mounted in a wave guide, said iris dimensioned to be resonant to the frequency of said carrier oscillations in at least one of its positions.

6. In combination with a source of signal bearing carrier waves, a pair of modulators each connected to receive said signal bearing carrier waves, a generator of unmodulated waves having the same frequency as said carrier waves, means for applying the waves from said generator to said modulators in such relative phase that the respective principal modulation products of said modulators are in phase quadrature with each other, means for vectorially adding the said respective modulation products, and means for deriving the signal from the resultant of the vectorial addition.

7. A circuit in accordance with claim 6 which comprises in combination a pair of intermodulators responsive to receive the respective modulation products from said modulators, a source of intermediate frequency, means for applying the waves from said intermediate frequency source to said intermodulators, and means combining the output components of said intermodulators in phase quadrature.

8. A communication system comprising in combination a central station and a plurality of satellite stations, a generator of carrier oscillations at said central station, means for varying the frequency of said oscillations, means responsive to said oscillations to radiate a beam thereof directed to one of said satellite stations, antenna means at said satellite station disposed in the path of said beam, means connected to said antenna means for absorbing and reflecting varying portions of said beam, a signal circuit connected to control the reflection and absorption of energy by said last-named means, and receiving means at said central station for receiving the signal bearing beam from said satellite station and deriving the signal therefrom, said receiving means comprising a pair of circuits for separating the signal bearing carrier energy of said received beam into two components, modulating and detecting means included in each of the circuits of said pair, conducting circuits connected between the output of said generator and said respective modulating and detecting means, said conducting circuits having electrical lengths that differ by approximately a quarter wavelength of the mean carrier frequency whereby said components of signal bearing carrier waves are respectively combined with components of unmodulated carrier waves in phase quadrature to produce a pair of resultant waves, an equalizing circuit responsive to the output of said detecting means, said equalizing circuit comprising means for adding said resultant waves vectorially, and means for deriving the signal therefrom.

9. A system in accordance with claim 8 in which said equalizing circuit comprises a source of intermediate frequency having a pair of output circuits connected thereto which respectively include means for separating the intermediate frequency components of said source by substantially 90 degree in phase, a pair of intermodulating circuits respectively connected to said modulating and detecting means and the said output circuits of said intermediate frequency source whereby to supermodulate each of said resultant waves with one of said intermediate frequency components, and means for combining the outputs of said intermodulating circuits.

10. A circuit for receiving a signal bearing carrier wave which comprises in combination a pair of circuits including modulating and detecting means and constructed to separate the energy of a received signal bearing carrier wave into two components, a generator of unmodulated carrier waves having the same carrier frequency as said received carrier waves, a pair of conducting circuits connected between the output of said generator and said modulating and detecting means and having electrical lengths that differ by approximately a quarter wavelength of the carrier frequency whereby said signal bearing carrier wave components are combined with components of unmodulated carrier waves in phase quadrature to produce a pair of resultant waves, an equalizing circuit comprising means for adding said resultant waves vectorially, and means connected to said equalizing circuit for deriving the signal therefrom.

11. A circuit in accordance with claim 10 in which said equalizing circuit comprises a source of intermediate frequency having a pair of output circuits connected thereto which respectively include means for separating the intermediate frequency components of said source by substantially 90 degrees in phase, a pair of intermodulating circuits respectively connected to said modulating and detecting means and the output circuits of said intermediate frequency source whereby to supermodulate each of said resultant waves with one of said intermediate frequency components and means for combining the outputs of said intermodulating circuits.

12. A communication system comprising in combination a central station and a satellite station, a generator of carrier oscillations at said central station, and means for varying the frequency of said oscillations through a substantially repetitive cycle, means to radiate said oscillations of varying frequency to said satellite station, antenna means at said satellite station, a modulating circuit connected to said antenna means comprising wave-guide means constructed to simultaneously reflect and modulate the said oscillations in a series of pulses whose times of occurrence are varied in accordance with signals impressed on said modulating circuit, and means at said central station for receiving and demodulating the said time varied carrier pulses.

13. A communication system in accordance with claim 12 in which said means for varying the frequency of said oscillations through a substantially repetitive cycle comprises a saw-tooth generator connected to modulate said carrier oscillations with a repetitive saw-tooth envelope at a superaudible rate.

14. A communication system comprising in combination a central station and a plurality of satellite stations, a generator of carrier oscillations at said central station, means in energy transfer relation to said carrier wave generator comprising a saw-tooth voltage generator for varying the frequency of said oscillations through a substantially repetitive saw-tooth sweep, a signaling circuit connected to modulate the output of said carrier wave generator, antenna means at said central station responsive to said frequency modulated carrier oscillations to radiate a beam thereof directed to a selected satellite station, antenna means disposed at said satellite station and directed to intercept the energy of said beam, electromechanical receiving and reflecting means in energy transfer relation with said last-named antenna comprising a wave-guide tuned to a frequency band substantially narrower than and included in the frequency range of said saw-tooth sweep, said receiving and reflecting means having a mechanically variable component whereby to vary the tuning thereof, a signaling circuit connected to said receiving and reflecting means to receive signals therefrom and to vary the dimension of said component in accordance with impressed signal voltages whereby to produce pulse signals whose times of occurrence vary in accordance with said signal voltages, receiving means at said central station to receive the pulsed carrier wave energy reflected from said satellite station and means in energy transfer relation with said last-named means to derive the signal from said pulsed carrier wave energy.

15. A system in accordance with claim 14 in which said electromechanical receiving and reflecting means comprises a wave guide cavity, and said mechanically variable component comprises an iris of variable dimension mounted therein, said cavity constructed to be resonant to a frequency within the frequency sweep of said carrier oscillations for at least one position of said iris.

16. A system in accordance with claim 15 in which said electromechanical receiving and reflecting means comprises an iris of variable dimension mounted in a wave guide, said iris dimensioned to be resonant to a frequency within the frequency sweep of said carrier oscillations in at least one of its positions.

17. A system in accordance with claim 14 adapted for time division multiplex reception for satellite stations at different distances from said central station, in which said means to derive the signal from said pulsed carrier wave energy comprises a plurality of signal responsive means corresponding to different satellite stations, and switching means synchronized with said saw-tooth sweep and operative to connect said signal responsive means in succession to said receiving means.

18. A system in accordance with claim 14 adapted for selective signal transmission to different satellite stations in the same direction from the central station which comprises satellite stations having electromechanical receiving and reflecting means which are respectively tuned to different frequency bands within the frequency range of said saw-tooth sweep, and means operative on said saw-tooth generator at the central station for limiting said saw-tooth sweep to a given frequency range corresponding to the frequency tuning certain of said satellite stations.

19. A system in accordance with claim 14 adapted for time division multiplex signal transmission to different satellite stations in the same direction from the central station which comprises satellite stations having electromechanical receiving and reflecting means which are respectively tuned to different frequency bands within the frequency range of said saw-tooth sweep, a plurality of signaling circuits corresponding to different satellite stations connected to modulate the output of said carrier wave generator, and switching means synchronized with said saw-tooth generator to connect said signaling means in succession to modulate the output of said carrier wave generator.

20. The method of communicating between a central station and a plurality of satellite stations at different distances but in the same direction from the central station which comprises generating and radiating a plurality of carrier wave beams of different frequencies toward said satellite stations, selectively receiving said different frequency carrier wave beams at respective satellite stations, reflecting and modulating the energy of each of said beams at a respective satellite station in accordance with impressed signals, and separately receiving and demodulating said reflected beams at said central station.

21. The method in accordance with claim 20 in which said different frequency beams are received and demodulated at the central station by respectively separating each of said beams into a pair of components, combining each of said components with a component of unmodulated carrier waves of substantially the same frequency as said modulated carrier waves while maintaining one of the components so combined in phase quadrature relation with the other of said combined components whereby a pair of resultant modulated waves is produced, adding said resultant waves vectorially, and deriving the signal from said vectorially added waves.

22. The method of receiving a signal bearing modulated carrier wave which comprises separating said modulated wave into a pair of components, combining each of said components separately with a respective one of a pair of unmodulated waves of carrier frequency while maintaining one member of said pair in phase quadrature relation with the other member, whereby a pair of resultant modulated waves are produced, adding said resultant waves vectorially, and deriving the signal from said vectorially added waves.

23. The method in accordance with claim 22 in which said components comprising in combination unmodulated and modulated carrier waves are added vectorially by the steps of respectively combining each of said components with components of an intermediate frequency, superposing said components including said intermediate frequency in phase quadrature, and detecting said signal therefrom.

24. The method of communication between a central station and a satellite station which comprises generating carrier oscillations at said central station, radiating a component of the oscillations so generated in a substantially parallel beam directed toward said satellite station, simultaneously reflecting and modulating the energy of said beam at said satellite station in accordance with an impressed signal, separating the signal modulated wave received at said central station into a pair of components, combining each of said signal modulated components with a component of unmodulated carrier waves of substantially the same frequency as said modulated carrier waves while maintaining one of the components so combined in phase quadrature relation with the other, whereby a pair of resultant modulated waves is produced, adding said resultant waves vectorially, and deriving the signal from said vectorially added waves.

25. The method in accordance with claim 24 in which said components comprising in combination unmodulated and modulated carrier waves are added vectorially by the steps of respectively combining each of said components in quadrature with equal components of an intermediate frequency, superposing said components including said intermediate frequency, and detecting said signal therefrom.

26. The method of communication between a central station and a plurality of satellite stations including tuned receiving and reflecting means which comprises generating carrier waves at said central station, frequency modulating said waves through a substantially repetitive saw-tooth sweep, radiating said frequency modulated waves in a beam of substantially parallel rays directed toward a selected satellite station, communicating between said central station and said selected satellite station by impressing signal modulations on said beam at said central station and receiving and demodulating at said selected satellite station, communicating between said selected satellite station and said central station by mechanically varying the tuning of said receiving and deflecting means in said satellite station in accordance with signal currents whereby to translate the energy of said carrier wave beam into a series of pulses directed toward said central station whose times of occurrence vary in accordance with said signal, and receiving said pulses at the central station and deriving the signal therefrom.

27. The method in accordance with claim 26 for discriminating at said central station between incoming signals from a plurality of satellite stations in the same direction but at different distances from said central station which comprises separating the received pulses from the different satellite stations by time division multiplex reception.

28. The method in accordance with claim 26 of selective communication between the central station and one of a plurality of satellite stations in the same direction but at different distances from said central station which comprises limiting the saw-tooth sweep of said oscillations radiated from the central station to a given band of frequencies, and tuning said receiving and reflecting means in a selected satellite station to said frequency band.

29. The method in accordance with claim 26 for multiplex transmission of outgoing signals directed to a plurality of satellite stations in the same direction but at different distances from said central station which comprises impressing said signal modulations directed to different respective stations on said carrier at different periods in the cycle corresponding to different frequency bands in the saw-tooth sweep of said carrier, and tuning said receiving and reflecting means at the respective satellite stations to said different frequency bands.

WALTER J. ALBERSHEIM.

REFERENCES CITED

The following references are of record in the file of this patent:

UNITED STATES PATENTS

| Number | Name | Date |
|---|---|---|
| 1,384,014 | Fessenden | July 5, 1921 |
| 1,771,148 | Sprague | July 22, 1930 |
| 2,089,639 | Bedford | Aug. 10, 1937 |
| 2,092,442 | Colwell | Sept. 7, 1937 |
| 2,118,161 | Chaffee | May 24, 1938 |
| 2,193,102 | Koch | Mar. 12, 1940 |
| 2,301,395 | Goldsmith | Nov. 10, 1942 |
| 2,413,963 | Fiske et al. | Jan. 7, 1947 |
| 2,425,314 | Hansell | Aug. 12, 1947 |
| 2,434,917 | Fuchs | Jan. 27, 1948 |
| 2,437,027 | Homrighous | Mar. 2, 1948 |
| 2,444,060 | Ohl | June 29, 1948 |
| 2,461,005 | Southworth | Feb. 8, 1949 |
| 2,461,646 | Lewis | Feb. 15, 1949 |
| 2,475,127 | Carlson | July 5, 1949 |